United States Patent
Shin et al.

(10) Patent No.: US 7,190,657 B2
(45) Date of Patent: Mar. 13, 2007

(54) OPTICAL PICKUP DEVICE

(75) Inventors: Yong-San Shin, Kyunggi-do (KR); Chun-Gi Kim, Kyunggi-do (KR); Oh-Byoung Kwon, Kyunggi-do (KR); Woo-Seok Choi, Kyunggi-do (KR); Sung-Wook Kim, Seoul (KR); No-Jun Kwak, Kyunggi-do (KR); Eui-Joong Kim, Kyunggi-do (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 591 days.

(21) Appl. No.: 10/791,510

(22) Filed: Mar. 2, 2004

(65) Prior Publication Data
US 2005/0128923 A1    Jun. 16, 2005

(30) Foreign Application Priority Data
Dec. 10, 2003    (KR) ............... 10-2003-0089756

(51) Int. Cl.
*G11B 7/00* (2006.01)
(52) U.S. Cl. ............... 369/112.1; 369/112.12; 369/112.07; 369/112.04
(58) Field of Classification Search ......... 369/112.12, 369/112.07, 112.04, 112.1
See application file for complete search history.

(56) References Cited

U.S. PATENT DOCUMENTS

| | | | | | |
|---|---|---|---|---|---|
| 5,029,154 | A | * | 7/1991 | Sumi et al. | 369/44.23 |
| 6,130,872 | A | * | 10/2000 | Sugiura et al. | 369/112.04 |
| 2002/0027844 | A1 | * | 3/2002 | Furuhata et al. | 369/44.37 |
| 2002/0097660 | A1 | * | 7/2002 | Komma et al. | 369/112.04 |
| 2002/0196726 | A1 | * | 12/2002 | Takeda | 369/112.04 |
| 2003/0179680 | A1 | * | 9/2003 | Park et al. | 369/112.04 |

FOREIGN PATENT DOCUMENTS

KR    267233    7/2000

* cited by examiner

*Primary Examiner*—Wayne Young
*Assistant Examiner*—Linh T. Nguyen
(74) *Attorney, Agent, or Firm*—Christensen O'Connor Johnson Kindness PLLC

(57) ABSTRACT

An optical pickup device including a dual wavelength light source module for emitting a selected one of two light beams having different wavelengths, a dual grating for splitting, into three beams, the selected light beam emitted from the dual wavelength light source, and a hologram for focusing the three beams of the selected light beam onto a photodetector having typical 8-section patterns such that the three beams of the selected light beam are focused onto the same spots as those of the other light beam, respectively.

21 Claims, 5 Drawing Sheets

OPTICAL PICKUP DEVICE

BACKGROUND OF THE INVENTION

1. Field of the Invention

The present invention relates to an optical pickup device, and more particularly to an optical pickup device which uses a dual grating adapted to split, into three beams, each of two light beams of different wavelengths selectively emitted from a dual wavelength light source module, while including a hologram capable of allowing a typical photodetector having 8-section patterns to detect both the three beams split from one light beam and the three beams split from the other light beam.

2. Description of the Related Art

Generally, optical pickup devices are adapted to reproduce signals recorded on an optical disc and to record signals on an optical disc. For such optical pickup devices, products for a compact disc (CD) and products for a digital versatile disc (DVD) are widely used.

Although products for DVDs have a superior performance in association with DVDs' high capacity, they cannot exist on the market unless they are compatible with products for CDs because most users are more familiar with products for CDs than products for DVDs, which are inexpensive and conventionally widely distributed. To this end, most of the currently commercially available optical pickup devices are of a compatible type so that they are usable for both the DVDs and the CDs.

Figure 1:
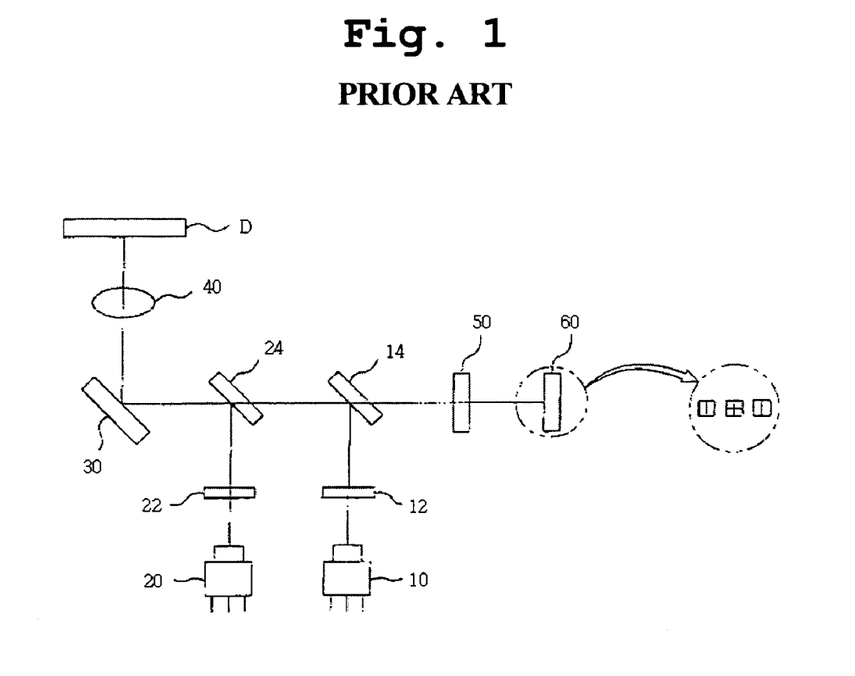
FIG. 1 is a schematic view illustrating an example of a conventional compatible optical pickup device.

FIG. 1 schematically illustrates an example of a conventional compatible optical pickup device.

Referring to FIG. 1, the conventional optical pickup device includes two light source modules 10 and 20 respectively adapted to generate light beams having different wavelengths. One of the light source modules, that is, the light source module 10, is a light source module for CDs having a wavelength of 780 nm, whereas the other light source module, that is, the light source module 20, is a light source module for DVDs having a wavelength of 650 nm.

The light beam emitted from the light source module 10 for CDs is incident onto a beam splitter 14 for CDs after being split into at least three beams, for example, zero, +1st, and −1st-order diffracted beams, by a grating 12 for CDs. The light beam is reflected by the beam splitter 14 for CDs so that its travel path is bent toward a mirror 30.

After being reflected by the mirror 30, the light beam for CDs travels toward an optical disc D as its travel path is bent by the mirror 30. The light beam is then focused onto a spot on the optical disc D through an objective lens 50. The focused light beam strikes a signal track on the optical disc D, and is then reflected therefrom, so that it is re-incident onto the mirror 30 via the same path as described above. The light beam is reflected again from the mirror 30, and then is incident onto a sensor lens 50 after passing through the beam splitter 14 for CDs. The sensor lens 50 condenses the light beam incident thereto, and sends the condensed light beam to a photodetector 60 which, in turn, detects the light beam received thereto, and generates an electrical signal, based on the detected light beam.

On the other hand, the light beam emitted from the light source module 20 for DVDs is incident onto a beam splitter 24 for DVDs after being split into at least three beams, for example, zero, +1st, and −1st-order diffracted beams, by a grating 22 for DVDs. The light beam is reflected by the beam splitter 24 for DVDs so that its travel path is bent toward the mirror 30.

Thereafter, the light beam for DVDs is sent to the photodetector 60 in a condensed state along the same optical path as that of the light beam for CDs.

That is, the light beam for CDs is reflected by the mirror 30, so that it travels toward the optical disc D as its travel path is bent by the mirror 30. The light beam is then focused onto a spot on the optical disc D through the objective lens 50.

The focused light beam strikes a signal track on the optical disc D, and is then reflected therefrom, so that it is re-incident onto the mirror 30 via the same path as described above. The light beam is reflected again from the mirror 30, and then incident onto the sensor lens 50 after passing through the beam splitter 14 for CDs. The sensor lens 50 condenses the light beam incident thereto, and sends the condensed light beam to a photodetector 60 which, in turn, detects the light beam received thereto, and generates an electrical signal, based on the detected light beam.

For the photodetector 60, a photodetector having 8-section patterns is typically used because the light beam emitted from the light source module 10 for CDs and the light beam emitted from the light source module 20 for DVDs are focused onto a spot on the photodetector 60 after traveling along the same optical path.

The conventional optical pickup device having the above mentioned configuration is compatible with both the CDs and the DVDs because it operates by use of the light beam emitted from the light source module 10 for CDs upon performing a reproduction/recording operation for a CD, while operating by use of the light beam emitted from the light source module 20 for DVDs upon performing a reproduction/recording operation for a DVD.

In the above mentioned conventional optical pickup device, however, its light source modules for CDs and DVDs have separate configurations, respectively. Also, separate gratings and separate beam splitters are used for CDs and DVDs, respectively. For this reason, the conventional optical pickup device uses an increased number of optical elements, so that it has a complex configuration while having problems of a degradation in assemblability and a degradation in productivity.

Furthermore, the increased number of optical elements causes an increase in manufacturing costs, thereby resulting in a reduction in competitiveness in terms of price.

Figure 2:
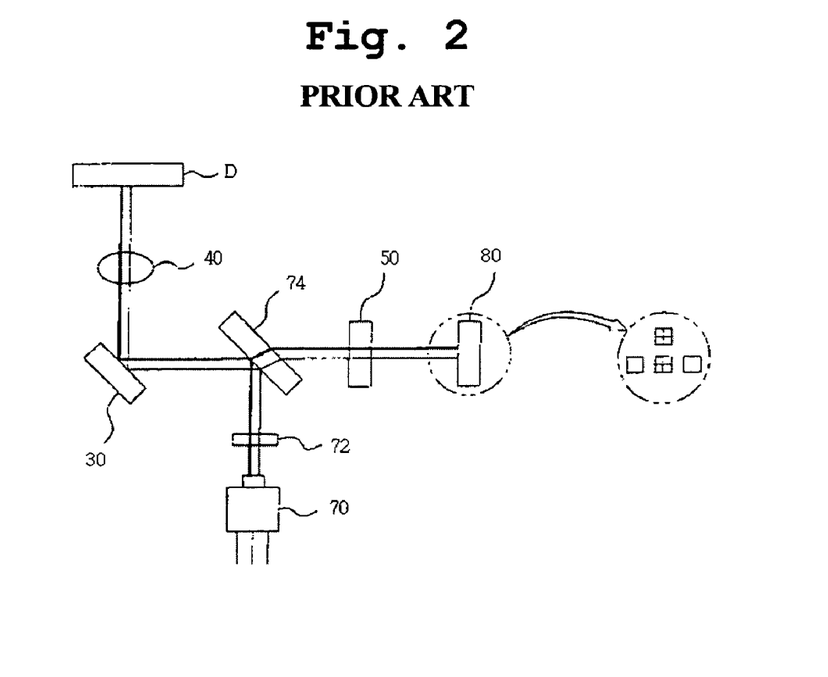
FIG. 2 is a schematic view illustrating an example of a conventional optical pickup device having a dual wavelength light source module.

FIG. 2 schematically illustrates an example of a conventional optical pickup device having a dual wavelength light source module.

Referring to FIG. 2, the conventional optical pickup device includes a dual wavelength light source module 70 for emitting a selected one of two light beams, that is, a light beam having a wavelength of 650 nm for DVD-family optical discs and a light beam having a wavelength of 780 nm for CD-family optical discs. In this case, the light beam for CDs and the light beam for DVDs are used only for reproduction purposes.

A light beam, which is emitted from the dual wavelength light source module 70, is incident onto a beam splitter 74 after being split into three beams by a grating 72. The light beam is reflected by the beam splitter 74 so that its travel path is bent toward a mirror 30. The grating 72 is designed to optimize the light beam for CDs, so as to enable tracking of the light beam for CDs.

After being reflected by the mirror 30, the light beam travels toward an optical disc D as its travel path is bent by the mirror 30. The light beam is then focused onto a spot on the optical disc D through an objective lens 50.

The focused light beam strikes a signal track on the optical disc D, and is then reflected therefrom, so that it is re-incident onto the mirror 30 via the same path as described above. The light beam is reflected again from the mirror 30, and then incident onto a sensor lens 50 after passing through the beam splitter 74.

The sensor lens 50 condenses the light beam incident thereto, and sends the condensed light beam to a photodetector 80 which, in turn, detects the light beam received thereto, and generates an electrical signal, based on the detected light beam. The light beam for CDs and the light beam for DVDs are focused on the photodetector 80 at different spots, respectively, because their emission points are spaced apart from each other by a certain distance. For this reason, a photodetector having 10-section patterns is typically used for the photodetector 80.

In this conventional optical pickup device having the above mentioned configuration, only one grating and only one beam splitter are used because it uses one dual wavelength light source module. Accordingly, this optical pickup device has advantages of a simple configuration, an improvement in assemblability, and an improvement in productivity in accordance with a reduced number of optical elements.

However, such an optical pickup device using a conventional dual wavelength light source module has a drawback in that it is used only for reproduction purposes.

Also, the grating used in this optical pickup device is designed to optimize the light beam for CDs. That is, the conventional grating is adapted to split a light beam for CDs into 3 diffracted beams, so as to enable tracking of the light beam for CDs. Of course, the light beam for DVDs is also split while passing through the grating, in accordance with the characteristics of the grating. However, the division of the light beam for DVDs cannot be achieved in an optimized state because the grating is designed to optimize the light beam for CDs. For this reason, the conventional grating has a difficulty in splitting both the light beam for CDs and the light beam for DVDs in an optimized state.

Furthermore, although the conventional optical pickup device uses a typical photodetector having 10-section patterns, this photodetector has a drawback in that it is adapted only for reproduction purposes, so that it cannot be used for recording purposes.

Meanwhile, Korean Patent No. 267233 discloses a technique in which light beams respectively emitted from different light sources are rendered to be focused onto a photodetector at the same spot, using a hologram.

However, this patent has problems of a complex configuration caused by use of two light source modules, and, thus, a degradation in assemblability, a degradation in productivity, and high manufacturing costs.

SUMMARY OF THE INVENTION

The present invention has been made in view of the above mentioned problems, and an object of the invention is to provide an optical pickup device which includes a dual wavelength light source module, thereby being capable of simplifying an optical system thereof, and thus, achieving an improvement in reliability, while reducing the number of optical elements used therein, and thus, reducing the manufacturing costs.

Another object of the invention is to provide an optical pickup device in which two light beams of different wavelengths emitted from a dual wavelength light source module pass through a single grating so that each light beam is split into three beams to obtain an accurate signal required for a recording/reproduction operation, thereby being capable of reducing the number of elements used therein, as compared to the case using two independent gratings.

Another object of the invention is to provide an optical pickup device in which two light beams of different wavelengths pass through a single grating adapted to split each light beam into three beams while causing the zero-order beam of one light beam and the first-order (+1st or −1st-order) beam of the other light beam to be focused onto a photodetector at the same spot, thereby being capable of detecting three beams split from one light beam and three beams split from another light beam having a wavelength different from that of the one light beam, using a typical photodetector having 8-section patterns.

In accordance with the present invention, these objects are accomplished by providing an optical pickup device comprising: a dual wavelength light source module for emitting a selected one of two light beams having different wavelengths; a wavelength selective dual grating having a predetermined thickness while being formed at an upper surface thereof with a plurality of upper diffraction grating patterns adapted to split the selected light beam, received from the dual wavelength light source, into at least three beams of zero, +1st, and −1st orders, when the selected light beam is one of the two light beams, and at a lower surface thereof with a plurality of lower diffraction grating patterns adapted to split the selected light beam into at least three beams of zero, +1st, and −1st orders, when the selected light beam is the other light beam; a beam splitter for receiving the selected light beam emerging from the dual grating, and reflecting the selected light beam toward an optical disc; an objective lens for receiving the selected light beam from the beam splitter, and focusing the selected light beam onto a spot on an optical disc; a hologram for receiving the three beams of the selected light beam reflected from the optical disc after striking a signal track of the optical disc, the hologram maximizing a diffraction efficiency of the zero-order one of the three beams, included in the selected light beam, traveling in a straight direction, when the selected light beam is the one light beam, while maximizing a diffraction efficiency of the +1st or −1st-order one of the three beams, included in the selected light beam, traveling in a refracted direction, when the selected light beam is the other light beam, the hologram being adjustable in position to focus the zero-order beam and the +1st or −1st-order beam on the same spot; and a photodetector for detecting the three beams of the selected light beam emerging from the hologram, and generating electrical signals, based on the detected beams, respectively.

The upper diffraction grating patterns and the lower diffraction grating patterns may have different tilt angles, respectively.

The predetermined thickness of the dual grating may be a thickness at which a distance between main and sub ones of the three beams, included in the one light beam, focused on the photodetector is identical to that of the other light beam.

The hologram may have a multi-step phase grating structure so that it maximizes respective diffraction efficiencies of the zero-order beam and the +1 or −1st-order beam.

The hologram may be installed to be movable along an optical axis while being rotatable about the optical axis.

The one light beam may be a light beam having a wavelength of 650 nm for DVDs, and the other light beam may be a light beam having a wavelength of 780 nm for CDs.

The lower diffraction grating patterns of the dual grating may be adapted to split the light beam for CDs, and the upper diffraction grating patterns of the dual grating is adapted to split the light beam for DVDs.

The hologram may be adapted to maximize a diffraction efficiency of a zero-order one of the light beam for DVDs, while maximizing a diffraction efficiency of a +1st-order one of the light beam for CDs.

The optical pickup device may further comprise a mirror arranged between the beam splitter and the optical disc, and adapted to reflect the selected light beam reflected from the beam splitter toward the optical disc.

The optical pickup may further comprise a front photodiode arranged in rear of the mirror, and adapted to adjust an optical power of the selected light beam.

The optical pickup may further comprise a collimator lens arranged between the beam splitter and the objective lens, and adapted to convert a divergent light beam into a parallel beam.

The optical pickup device may further comprise a sensor lens arranged between the hologram and the photodetector, and adapted to focus the beams emerging from the hologram onto associated cells of the photodetector, respectively.

BRIEF DESCRIPTION OF THE DRAWINGS

The above objects, and other features and advantages of the present invention will become more apparent after reading the following detailed description when taken in conjunction with the drawings, in which.

DESCRIPTION OF THE PREFERRED EMBODIMENTS

Now, the present invention will be described in detail with reference to the annexed drawings.

Figure 3:
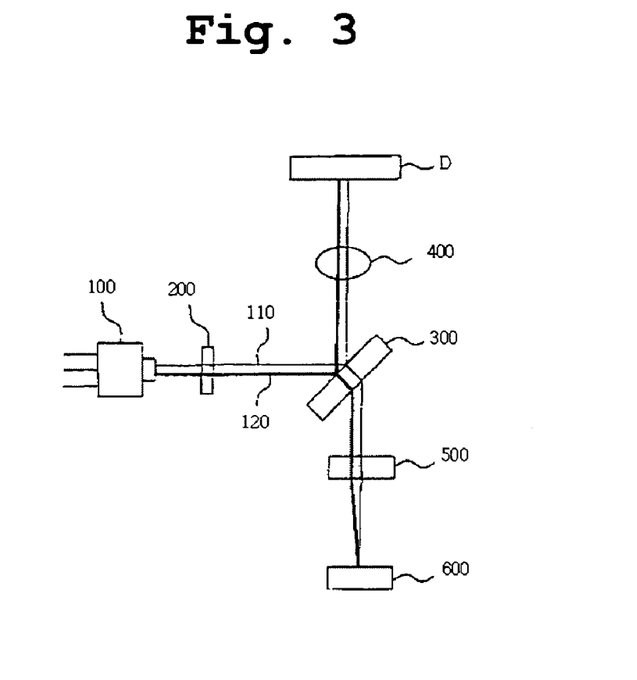
FIG. 3 is a schematic view illustrating an optical pickup device according to an embodiment of the present invention.
Figure 4:
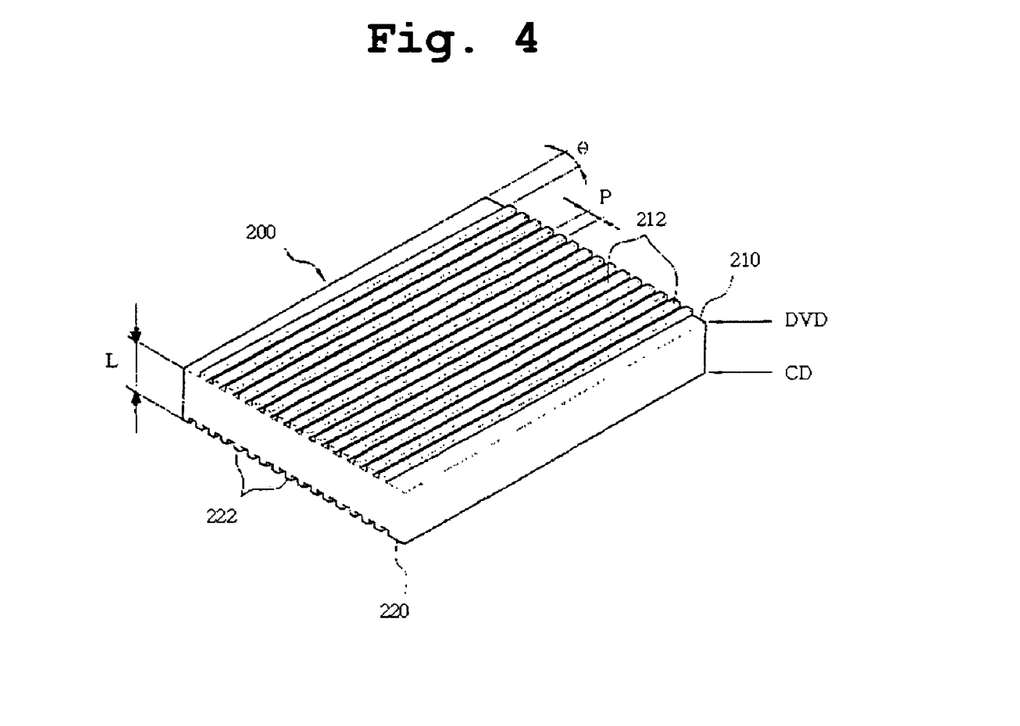
FIG. 4 is a perspective view illustrating the structure of a dual grating used in accordance with the present invention.
Figure 5:
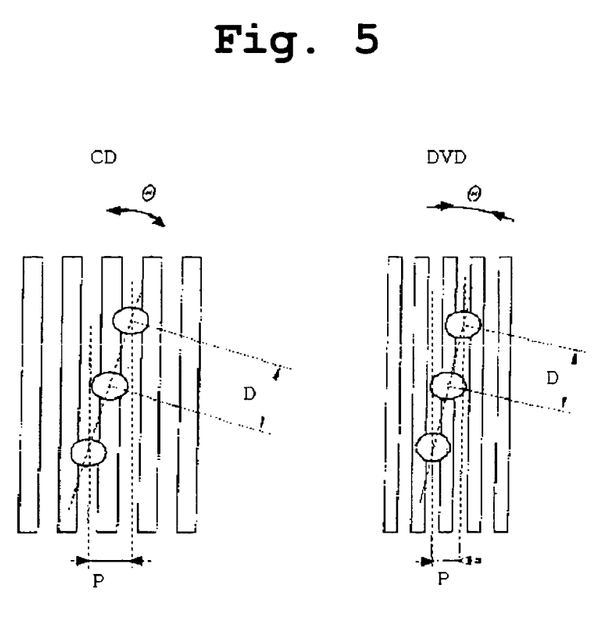
FIG. 5 is a schematic enlarged view illustrating respective parts of a CD type optical disc and a DVD type optical disc, in order to explain a method for deriving the pattern tilt angle of the dual grating.
Figure 6:
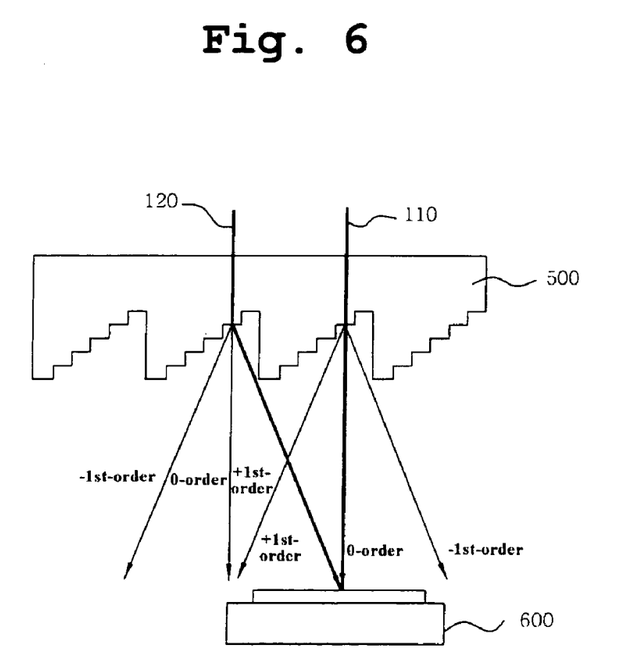
FIG. 6 is a schematic side view illustrating the structure of a hologram used in accordance with the present invention.
Figure 7:
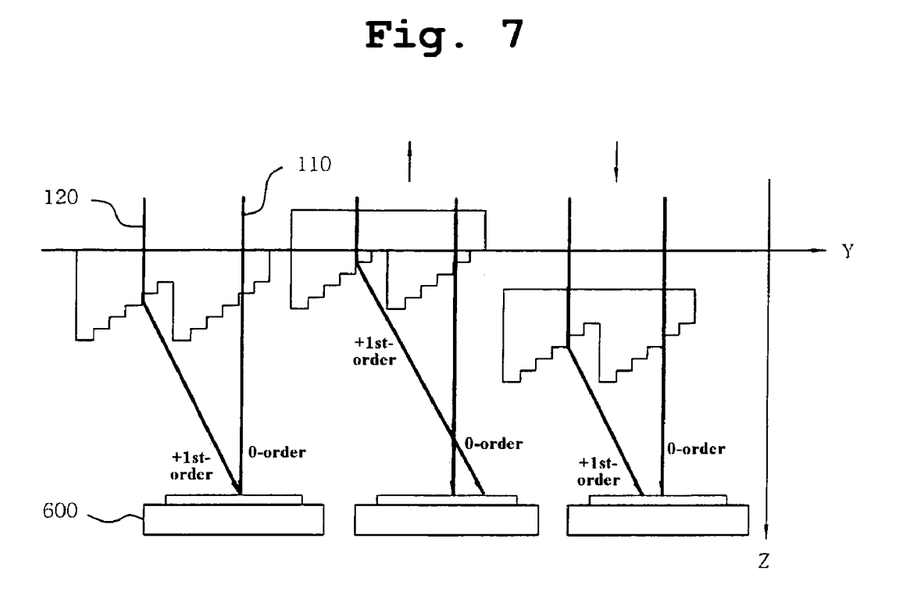
FIG. 7 is a schematic side view illustrating a variation in light beams reaching a photodetector when the hologram is shifted along an optical axis.
Figure 8:
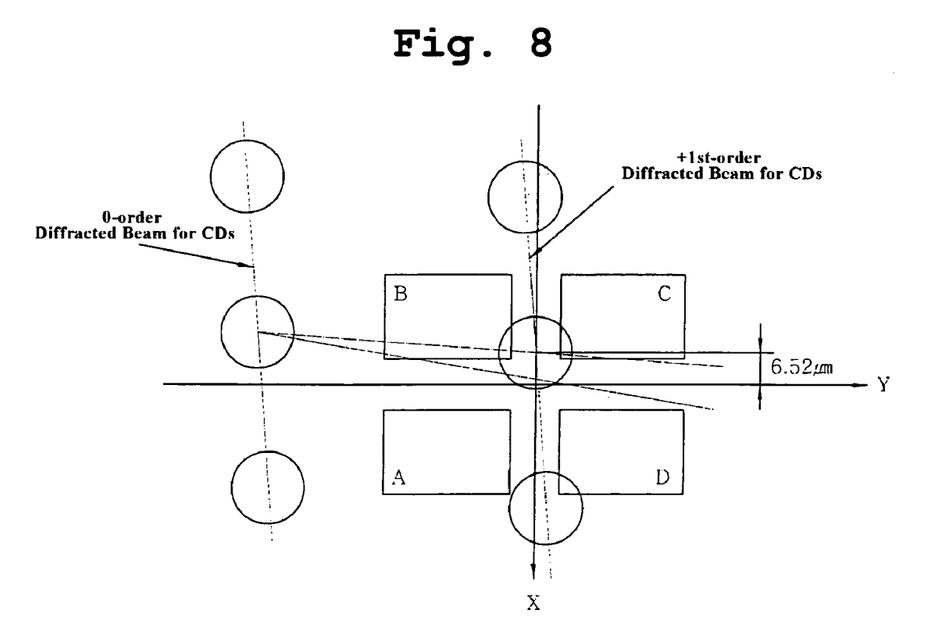
FIG. 8 is a schematic side view illustrating a variation in light beams reaching the photodetector when the hologram rotates about the optical axis.

FIG. 3 is a schematic view illustrating an optical pickup device according to an embodiment of the present invention. FIG. 4 is a perspective view illustrating the structure of a dual grating used in accordance with the present invention. FIG. 5 is a schematic enlarged view illustrating respective parts of a CD type optical disc and a DVD type optical disc, in order to explain a method for deriving the pattern tilt angle of the dual grating. FIG. 6 is a schematic side view illustrating the structure of a hologram used in accordance with the present invention. FIG. 7 is a schematic side view illustrating a variation in light beams reaching a photodetector when the hologram is shifted along an optical axis. FIG. 8 is a schematic side view illustrating a variation in light beams reaching the photodetector when the hologram rotates about the optical axis.

Referring to FIG. 3, the optical pickup device according to the present invention includes a dual wavelength light source module 100 including two chips arranged to be spaced apart from each other by a certain distance, and adapted to emit two light beams having different wavelengths, respectively. Thus, the dual wavelength light source module 100 emits a selected one of the two light beams. In place of the dual wavelength light source module, the optical pickup device may include a dual wavelength light source module including a single chip adapted to selectively emit two light beams having different wavelengths. Here, one of the two light beams is a light beam 110 having a wavelength of 650 nm for DVDs, whereas the other light beam is a light beam 120 having a wavelength of 780 nm for CDs.

The light beam emitted from the dual wavelength light source module 100 is split into at least three beams, for example, zero, +1st, and −1st-order beams while passing through a wavelength selective dual grating, and then sent to a beam splitter 300. After being reflected by the beam splitter 300, the light beam travels toward an optical disc D as its travel path is bent by the beam splitter 300. The light beam is then focused onto the optical disc D through an objective lens 400.

Referring to FIG. 4, the dual grating 200 has a certain thickness, while being provided, at upper and lower surfaces 210 and 220 thereof, with a plurality of upper diffraction grating patterns 212 and a plurality of lower diffraction grating patterns 222. The upper and lower diffraction grating patterns 212 and 222 are arranged in a state of being tilted at certain angles, respectively. One of the light beams selectively emitted from the dual wavelength light source module 100 is split into at least three beams, for examples zero, +1st, and −1st-order beams, while passing through the lower diffraction grating patterns 222, whereas the other light beam is split into at least three beams, for example, zero, +1st, and −1st-order beams, while passing through the upper diffraction grating patterns 212. Since the light beam for CDs exhibits a diffraction higher than that of the light beam for DVDs, it is preferable that the light beam 120 for CDs is split into three beams while passing through the lower diffraction grating patterns 222, whereas the light beam 110 for DVDs is split into three beams while passing through the upper diffraction grating patterns 212. Of course, it may be possible to split the light beam 110 for DVDs by the lower diffraction grating patterns 222 while splitting the light beam 120 for CDs by the upper diffraction grating patterns 212.

In accordance with the present invention, the dual grating 200 is designed, taking into consideration the thickness thereof (the distance between the upper and lower diffraction grating patterns), and respective tilt angles of the upper and lower diffraction grating patterns.

The tilt angles of the upper and lower diffraction grating patterns should be individually derived. This is because the three beams split from the light beam for CDs passing through the lower diffraction grating patterns 222 and the three beams split from the light beam for DVDs passing through the upper diffraction grating patterns 212 are focused on the optical disc D at different spots, respectively.

Also, the thickness of the dual grating 200 should be designed so that the distance between the main and sub beams of the light beam 120 for CDs focused on the photodetector is identical to that of the light beam 110 for DVDs. In accordance with such a design, when two different light beams are focused on a photodetector, the zero-order beam of one light beam, that is, the light beam for DVDs, and the first-order (+1st or −1st-order) beam of the other light beam, that is, the light beam for CDs, are focused on the same cell of the photodetector. Of course, where the two different light beams are focused on the photodetector such that their inter-beam distances on the photodetector are identical to each other, they are focused on the optical disc D such that their inter-beam distances on the optical disc D are identical to each other.

Now, expressions respectively adapted to derive the tilt angle of diffraction grating patterns in a dual grating and the thickness of the dual grating will be described with reference to FIGS. 4 and 5.

First, the tilt angle of diffraction grating patterns can be derived by use of the following Expression 1:

$$\Theta = \text{ASIN}\left(\frac{TP/2}{D}\right) \qquad \text{[Expression 1]}$$

where, $\Theta$ represents the tilt angle of diffraction grating patterns, TP represents the track pitch of the optical disc, and D represents the distance between the main and sub ones of the three split beams focused on the optical disc.

An example adapted to derive respective tilt angles of the upper and lower diffraction grating patterns 212 and 222 using Expression 1 will be described hereinafter.

Where it is assumed that the track pitch TP of an optical disc for CDs is 1.6 μm, and the distance D between the main and sub beams focused on the optical disc is 30 μm, the tilt angle $\Theta$ of the lower diffraction grating patterns 222 in the dual grating 200 is about 1.528°.

On the other hand, Where it is assumed that the track pitch TP of an optical disc for CDs is 1.6 μm, and the distance D between the main and sub beams focused on the optical disc is 30 μm, the tilt angle $\Theta$ of the upper diffraction grating patterns 212 in the dual grating 200 is about 0.706°.

Under the above conditions, accordingly, it is desirable to design the lower diffraction grating patterns 222 such that the tilt angle thereof corresponds to about 1.528°, while designing the upper diffraction grating patterns 212 such that the tilt angle thereof corresponds to about 0.706°.

In this case, the difference between the tilt angle of the lower diffraction grating patterns 222 and the tilt angle of the upper diffraction grating patterns 212 in the dual grating 200 is about 0.7470°. This angle difference is referred to as a "relative tilt angle". Where a dual grating is manufactured while being provided with such a relative tilt angle, there is convenience in that the phase adjustment of two wavelengths for DVDs and CDs can be achieved by phase-adjusting only one of the two wavelengths because the phase of the other wavelength is automatically adjusted in accordance with the phase adjustment of the one wavelength.

Next, the thickness of the dual grating 200 can be derived by use of the following Expression 2:

$$T = L_{(DVD)} - L_{(CD)} \qquad \text{[Expression 2]}$$

where, T represents the thickness of the dual grating, $L_{(DVD)}$ represents the distance between the point, at which a light beam for DVDs is emitted from a dual wavelength light source module, and the surface of the dual grating where division of the light beam for DVDs is carried out, $L_{(CD)}$ represents the distance between the point, at which a light beam for CDs is emitted from the dual wavelength light source module, and the surface of the dual grating where division of the light beam for CDs is carried out.

The distances $L_{(DVD)}$ and $L_{(CD)}$ vary depending on the pattern pitch of the dual grating, as expressed by the following Expression 3:

$$D \propto L \times \lambda / P \qquad \text{[Expression 3]}$$

where, D represents the distance between the main and sub ones of the three split beams focused on the photodetector, L represents the distance between the point, at which the light beam for DVD or CDs is emitted from the dual wavelength light source module, and the surface of the dual grating where division of the light beam is carried out, $\lambda$ represents the wavelength of the light beam, and P represents the pattern pitch of the dual grating.

An example adapted to derive the thickness of the dual grating using Expressions 2 and 3 will be described hereinafter.

Where it is assumed that the pattern pitch P of the dual grating is 20 μm, and the distance L between the main and sub beams of a light beam when the light beam is focused on the photodetector is 200 μm, the distance $L_{(DVD)}$ associated with the light beam having a wavelength of 650 nm for DVDs corresponds to about 4.03 mm, whereas the distance $L_{(CD)}$ associated with the light beam having a wavelength of 780 nm for CDs corresponds to about 3.36 mm. These values can be derived, using Expression 3.

Accordingly, the thickness of the dual grating 200 corresponds to 0.67 mm (4.03 mm−3.36 mm=0.67 mm), based on Expression 2.

Where it is assumed in another example that the pattern pitch P of the dual grating is 30 μm, and the distance L between the main and sub beams of a light beam when the light beam is focused on the photodetector is 200 μm, the distance $L_{(DVD)}$ associated with the light beam having a wavelength of 650 nm for DVDs corresponds to about 6.03 mm, based on Expression 3, whereas the distance $L_{(CD)}$ associated with the light beam having a wavelength of 780 nm for CDs corresponds to about 5.03 mm, based on Expression 3.

Accordingly, the thickness of the dual grating 200 corresponds to 1.00 mm (6.03 mm−5.03 mm=1.00 mm), based on Expression 2.

In either example, the distances L(DVD) and L(CD) can be derived by use of a separate simulation program while adjusting the distance between the main and sub beams of the light beam focused on the photodetector such that the distance corresponds to 200 μm, under the condition in which the pattern pitch is set to be 20 μm or 30 μm.

Referring to FIG. 3 again, the three beams of the light beam reflected from the optical disc after striking signal tracks of the optical disc pass through the objective lens 400 and the beam splitter 300 in a sequential fashion. Thereafter, the three beams are focused onto associated cells of the photodetector 600 via the hologram 500, respectively. The photodetector 600 detects the three beams received thereto, and then generates electrical signals, based on the detected beams, respectively.

Referring to FIG. 6, the hologram 500 has a multi-step phase grating structure. In accordance with this structure, the hologram 500 can maximize the diffraction efficiency of the zero-order beam, included in one of the light beams passing through the hologram 500, traveling in a straight direction, while maximizing the diffraction efficiency of the first-order (+1st or −1st-order) beam, included in the other light beam, in particular, the +1st-order beam, traveling in a refracted direction, thereby causing the zero and +1st-order beams to be focused on the same spot.

It is preferable that the light beam, in which the diffraction efficiency of the zero-order beam thereof is maximized, corresponds to the light beam 110 having a wavelength of 650 nm for DVDs, whereas the light beam, in which the diffraction efficiency of the +1st-order beam thereof is maximized, corresponds to the light beam 120 having a wavelength of 780 nm for CDs. However, it may be possible to implement an arrangement in which the optical path of the light beam for DVDs and the optical path of the light beam for CDs are interchanged. In this case, the hologram may be configured to maximize the diffraction efficiency of the −1st-order beam included in the light beam for CDs. Alternatively, the hologram may be configured to maximize the diffraction efficiency of the zero-order beam included in the light beam for CDs while maximizing the diffraction efficiency of the +1st-order beam included in the light beam for DVDs.

The hologram 500 is installed such that it is movable along an optical axis while being rotatable about the optical axis, in order to focus, on the same spot, the zero-order beam included in the light beam 110 for DVDs and the +1st-order beam included in the light beam 120 for CDs.

That is, when the hologram 500 moves along the optical axis, the light spot of the +1st beam, included in the light beam 120 for CDs, on the photodetector is shifted along the Y-axis. Accordingly, it is possible to focus, on the same spot, the zero-order beam included in the light beam 110 for DVDs and the +1st-order beam included in the light beam 120 for CDs by appropriately moving the hologram 500 along the optical axis.

Meanwhile, when the hologram 500 is moved along the optical axis to focus, on the same spot, the zero-order beam included in the light beam 110 for DVDs and the +1st-order beam included in the light beam 120, the +1st-order beam included in the light beam 120 is offset along the X-axis by a certain distance, for example, about −6.52 µm, as shown in FIG. 8. This offset can be compensated for by rotating the hologram 500 about the optical axis by an angle of about 2.5°.

On the other hand, it is preferable that both the dual grating 200 and the hologram 500 are made of a material having a thermal expansion coefficient sufficient to compensate for the displacement of a beam caused by a variation in the wavelength of the beam depending on a variation in temperature.

Now, the operation, function, and effect of the optical pickup device having the above described configuration according to the present invention will be described.

In accordance with operation of the optical pickup device according to the present invention, the dual wavelength light source module 100 selectively emits the light beam 110 having a wavelength of 650 nm for DVDs and the light beam 120 having a wavelength of 780 nm for CDs. In this case, the light beams 110 and 120 for DVDs and CDs are emitted at emission points spaced apart from each other by a certain distance, respectively, while traveling the same optical path.

The light beam 110 for DVDs emitted from the dual wavelength light source module 100 then passes through the dual grating 200. When the light beam 110 passes through the dual grating 200, it is split into at least three beams, for example, zero, +1st, and −1st-order beams while being diffracted by the upper diffraction grating patterns 212 of the dual grating 200. The three beams are then incident onto the beam splitter 300. The three beams incident onto the beam splitter 300 are reflected toward the optical disc D by the beam splitter 300, and are then focused onto the optical disc D through the objective lens 400.

The three beams reflected from an information track of the optical disc D pass through the objective lens 400 and beam splitter 300 along the same optical path as described above, and then reach the hologram 500. After passing through the hologram 500, the beams are focused onto associated cells of the photodetector 600, respectively. The zero-order one of the three beams for DVDs increases in diffraction efficiency while passing through the hologram 500. This zero-order beam reaches the central cell of the photodetector 600.

On the other hand, the light beam 120 for CDs emitted from the dual wavelength light source module 100 passes through the dual grating 200. When the light beam 110 passes through the dual grating 200, it is split into at least three beams, for example, zero, +1st, and −1st-order beams while being diffracted by the lower diffraction grating patterns 222 of the dual grating 200. The three beams are then incident onto the beam splitter 300. The three beams incident onto the beam splitter 300 are reflected toward the optical disc D by the beam splitter 300, and then focused onto the optical disc D through the objective lens 400.

The three beams reflected from an information track of the optical disc D pass through the objective lens 400 and beam splitter 300 along the same optical path as described above, and then reach the hologram 500. After passing through the hologram 500, the beams are focused onto associated cells of the photodetector 600, respectively. The +1st-order one of the three beams for CDs increases in diffraction efficiency while passing through the hologram 500. This +1st-order beam reaches the central cell of the photodetector 600.

Thus, the zero-order one of the three beams for DVDs and the +1st-order one of the three beams for CDs, which reach the photodetector 600, are focused onto the same cell of the photodetector 600. Where the zero-order one of the three beams for DVDs and the +1st-order one of the three beams for CDs are not focused onto the same cell of the photodetector 600, this can be solved by adjusting the position of the hologram 500 along the optical axis, or rotating the hologram 500 about the optical axis, along therewith, thereby adjusting the position of the +1st-order one of the three beams for CDs. For example, when it is desired to adjust the position of the +1st-order one of the three beams for CDs on the photodetector 600 along the Y-axis, this can be achieved by adjusting respective positions of the three beams for CDs while shifting the hologram 500 along the optical axis. On the other hand, when it is desired to adjust the position of the +1st-order one of the three beams for CDs on the photodetector 600 along the X-axis, this can be achieved by adjusting respective positions of the three beams for CDs while rotating the hologram 500 about the optical axis.

In accordance with the optical pickup device of the present invention, which has the above described configuration and operates as described above, it is possible to obtain accurate tracking and focusing signals because each of the light beams for DVDs and CDs is split into three beams while passing through the dual grating. Accordingly, the optical pickup device can be used for both the DVDs and the CDs for recording and reproduction purposes while being compatible with both the DVDs and the CDs.

The optical pickup device of the present invention uses a dual wavelength light source module adapted to selectively emit a light beam for DVDs and a light beam for CDs. Also, the optical pickup device does not use independent gratings for respective light beams for DVDs and CDs, but instead uses the dual grating 200. Accordingly, it is possible to minimize the number of optical elements used in the optical pickup device, thereby simplifying the configuration of the optical pickup device. In accordance with such a simplified configuration, it is possible to achieve an improvement in assemblability, and an improvement in productivity. Moreover, it is possible to achieve a reduction in manufacturing costs, thereby resulting in an increase in competitiveness in terms of price.

In accordance with the present invention, a typical photodetector having 8-section patterns can be used for both the DVDs and the CDs because it is possible to focus the zero-order one of the three beams for DVDs and the +1st-order one of the three beams for CDs onto the same cell of the photodetector by maximizing the diffraction efficiencies of those beams. Therefore, it is unnecessary to develop a photodetector having a new pattern structure. Thus, there is an advantage of a reduction in manufacturing costs.

In accordance with the present invention, both the dual grating and the hologram are made of a material having a thermal expansion coefficient sufficient to compensate for the displacement of a beam caused by a variation in the wavelength of the beam depending on a variation in temperature. Accordingly, it is possible to prevent the beam from being shifted on the photodetector due to the temperature variation.

Figure 9:
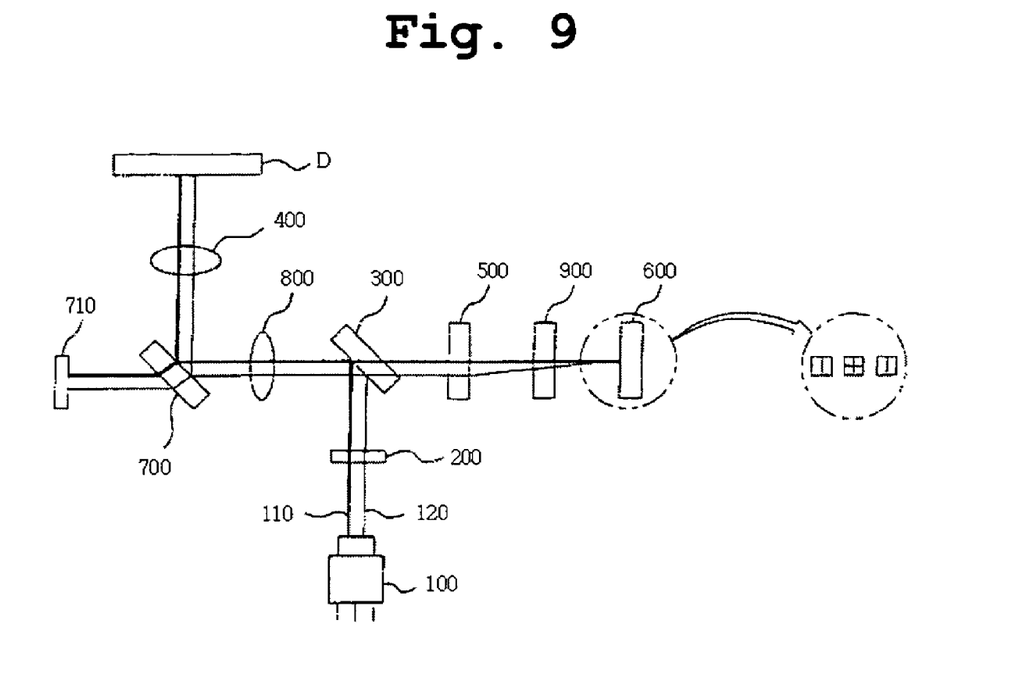
FIG. 9 is a schematic view illustrating an optical pickup device according to another embodiment of the present invention.

Meanwhile, FIG. 9 schematically illustrates an optical pickup device according to another embodiment of the present invention.

This embodiment is identical to the above described embodiment in terms of the operations and functions of basic constitutive elements, except that a mirror, a front photodiode, a collimator lens, and a sensor lens, each of which has a typical structure, are additionally used. Accordingly, the following description will be given in conjunction with is constitutive elements different from those of the above described embodiment.

In accordance with this embodiment of the present invention, a mirror 700 is arranged between the beam splitter 300 and the optical disc D, so as to send the light beam reflected from the beam splitter 300 toward the optical disc D.

A front photo diode 710 is also arranged in rear of the mirror 700 in order to adjust the optical power of the light beam.

In addition, a collimator lens 800 is arranged between the beam splitter 300 and the objective lens 400, in order to convert a divergent light beam into a parallel light beam.

Also, a sensor lens 900 is arranged between the hologram 500 and the photodetector 600, in order to focus the light beam emerging from the hologram 500 onto an associated cell of the photodetector 600.

Since the above elements applied to the present invention are well known, no description of operations and functions thereof will be given.

The optical pickup devices configured in accordance with the present invention is applicable to any kind of optical recording/reproducing apparatus.

As apparent from the above description, in accordance with the present invention, it is possible to split, into three beams, each of the light beams for DVDs and CDs selectively emitted from a dual wavelength light source module, at the upper or lower surface of a dual grating. Accordingly, it is possible to minimize the number of optical elements used in an optical pickup device according to the present invention, thereby simplifying an optical system of the optical pickup device, and thus, achieving an improvement in reliability, a reduction in the manufacturing costs, an improvement in assemblability, and an improvement in productivity.

In accordance with the present invention, the three beams split from one light beam and the three beams split from the other light beam are focused onto a photodetector at the same spots, respectively. Accordingly, it is possible to use a typical photodetector having 8-section patterns without any requirement to develop a photodetector having a new pattern structure. Thus, there is an advantage of a reduction in the manufacturing costs.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An optical pickup device comprising:
   a dual wavelength light source module for emitting a selected one of two light beams having different wavelengths;
   a wavelength selective dual grating having a predetermined thickness while being formed at an upper surface thereof with a plurality of upper diffraction grating patterns adapted to split said selected light beam, received from said dual wavelength light source, into at least three beams of zero, +1st, and −1st orders, when said selected light beam is one of said two light beams, and at a lower surface thereof with a plurality of lower diffraction grating patterns adapted to split said selected light beam into at least three beams of zero, +1st, and −1st orders, when said selected light beam is the other light beam;
   a beam splitter for receiving said selected light beam emerging from said dual grating, and reflecting said selected light beam toward an optical disc;
   an objective lens for receiving said selected light beam from said beam splitter, and focusing said selected light beam onto a spot on an optical disc;
   a hologram for receiving said three beams of said selected light beam reflected from said optical disc after striking a signal track of said optical disc, said hologram maximizing a diffraction efficiency of the zero-order one of said three beams, included in said selected light beam, traveling in a straight direction, when said selected light beam is said one light beam, while maximizing a diffraction efficiency of the +1st or −1st-order one of said three beams, included in said selected light beam, traveling in a refracted direction, when said selected light beam is said other light beam, said hologram being adjustable in position to focus said zero-order beam and said +1st or −1st-order beam on the same spot; and
   a photodetector for detecting said three beams of said selected light beam emerging from said hologram, and generating electrical signals, based on said detected beams, respectively.

2. The optical pickup device according to claim 1, wherein said upper diffraction grating patterns and said lower diffraction grating patterns have different tilt angles, respectively.

3. The optical pickup device according to claim 2, wherein respective tilt angles of said upper and lower diffraction grating patterns are defined by the following expression:

$$\Theta = \text{ASIN}\left(\frac{TP/2}{D}\right)$$

where, $\Theta$ represents a tilt angle of diffraction grating patterns, TP represents a track pitch of an optical disc, and D represents a distance between main and sub ones of three split beams focused on the optical disc.

4. The optical pickup device according to claim 1, wherein said predetermined thickness of said dual grating is a thickness at which a distance between main and sub ones of said three beams, included in said one light beam, focused on said photodetector is identical to that of said other light beam.

5. The optical pickup device according to claim 1, wherein said hologram has a multi-step phase grating structure so that it maximizes respective diffraction efficiencies of said zero-order beam and said +1 or −1st-order beam.

6. The optical pickup device according to claim 1, wherein said hologram is installed to be movable along an optical axis while being rotatable about said optical axis.

7. The optical pickup device according to claim 1, wherein said one light beam is a light beam having a wavelength of 650 nm for DVDs, and said other light beam is a light beam having a wavelength of 780 nm for CDs.

8. The optical pickup device according to claim 7, wherein said lower diffraction grating patterns of said dual grating are adapted to split said light beam for CDs, and said upper diffraction grating patterns of said dual grating are adapted to split said light beam for DVDs.

9. The optical pickup device according to claim 7, wherein said hologram is adapted to maximize a diffraction efficiency of a zero-order one of said light beam for DVDs, while maximizing a diffraction efficiency of a +1st-order one of said light beam for CDs.

10. The optical pickup device according to claim 1, further comprising:
a mirror arranged between said beam splitter and said optical disc, and adapted to reflect said selected light beam reflected from said beam splitter toward said optical disc.

11. The optical pickup device according to claim 10, further comprising:
a front photodiode arranged in rear of said mirror, and adapted to adjust an optical power of said selected light beam.

12. The optical pickup device according to claim 1, further comprising:
a collimator lens arranged between said beam splitter and said objective lens, and adapted to convert a divergent light beam into a parallel beam.

13. The optical pickup device according to claim 1, further comprising:
a sensor lens arranged between said hologram and said photodetector, and adapted to focus said beams emerging from said hologram onto associated cells of said photodetector, respectively.

14. An optical pickup device comprising:
a dual wavelength light source module for emitting a selected one of two light beams having different wavelengths;
a wavelength selective dual grating having a predetermined thickness while being formed at an upper surface thereof with a plurality of upper diffraction grating patterns adapted to split said selected light beam, received from said dual wavelength light source, into at least three beams of zero, +1st, and −1st orders, when said selected light beam is one of said two light beams, and at a lower surface thereof with a plurality of lower diffraction grating patterns adapted to split said selected light beam into at least three beams of zero, +1st, and −1st orders, when said selected light beam is the other light beam;
a beam splitter for receiving said selected light beam emerging from said dual grating, and reflecting said selected light beam toward an optical disc;
a mirror arranged between said beam splitter and said optical disc, and adapted to reflect said selected light beam reflected from said beam splitter toward said optical disc;
a front photodiode arranged in rear of said mirror, and adapted to adjust an optical power of said selected light beam;
a collimator lens arranged between said beam splitter and said objective lens, and adapted to convert a divergent light beam into a parallel light beam;
an objective lens for focusing, onto a spot on an optical disc, said selected light beam traveling toward said optical disc;
a hologram for receiving said three beams of said selected light beam reflected from said optical disc after striking a signal track of said optical disc, said hologram maximizing a diffraction efficiency of the zero-order one of said three beams, included in said selected light beam, traveling in a straight direction, when said selected light beam is said one light beam, while maximizing a diffraction efficiency of the +1st or −1st-order one of said three beams, included in said selected light beam, traveling in a refracted direction, when said selected light beam is said other light beam, said hologram being adjustable in position to focus said zero-order beam and said +1st or −1st-order beam on the same spot;
a photodetector for detecting said three beams of said selected light beam emerging from said hologram, and generating electrical signals, based on said detected beams, respectively; and
a sensor lens arranged between said hologram and said photodetector, and adapted to focus said beams emerging from said hologram onto associated cells of said photodetector, respectively.

15. The optical pickup device according to claim 14, wherein said upper diffraction grating patterns and said lower diffraction grating patterns have different tilt angles, respectively.

16. The optical pickup device according to claim 14, wherein said predetermined thickness of said dual grating is a thickness at which a distance between main and sub ones of said three beams, included in said one light beam, focused on said photodetector is identical to that of said other light beam.

17. The optical pickup device according to claim 14, wherein said hologram has a multi-step phase grating structure so that it maximizes respective diffraction efficiencies of said zero-order beam and said +1 or −1st-order beam.

18. The optical pickup device according to claim 14, wherein said hologram is installed to be movable along an optical axis while being rotatable about said optical axis.

19. The optical pickup device according to claim 14, wherein said one light beam is a light beam having a wavelength of 650 nm for DVDs, and said other light beam is a light beam having a wavelength of 780 nm for CDs.

20. The optical pickup device according to claim 19, wherein said lower diffraction grating patterns of said dual grating are adapted to split said light beam for CDs, and said upper diffraction grating patterns of said dual grating are adapted to split said light beam for DVDs.

21. The optical pickup device according to claim 19, wherein said hologram is adapted to maximize a diffraction efficiency of a zero-order one of said light beam for DVDs, while maximizing a diffraction efficiency of a +1st-order one of said light beam for CDs.

* * * * *